F. H. ANDREWS.
FAUCET COUPLING ATTACHMENT.
APPLICATION FILED JUNE 3, 1914.
1,122,844.
Patented Dec. 29, 1914.
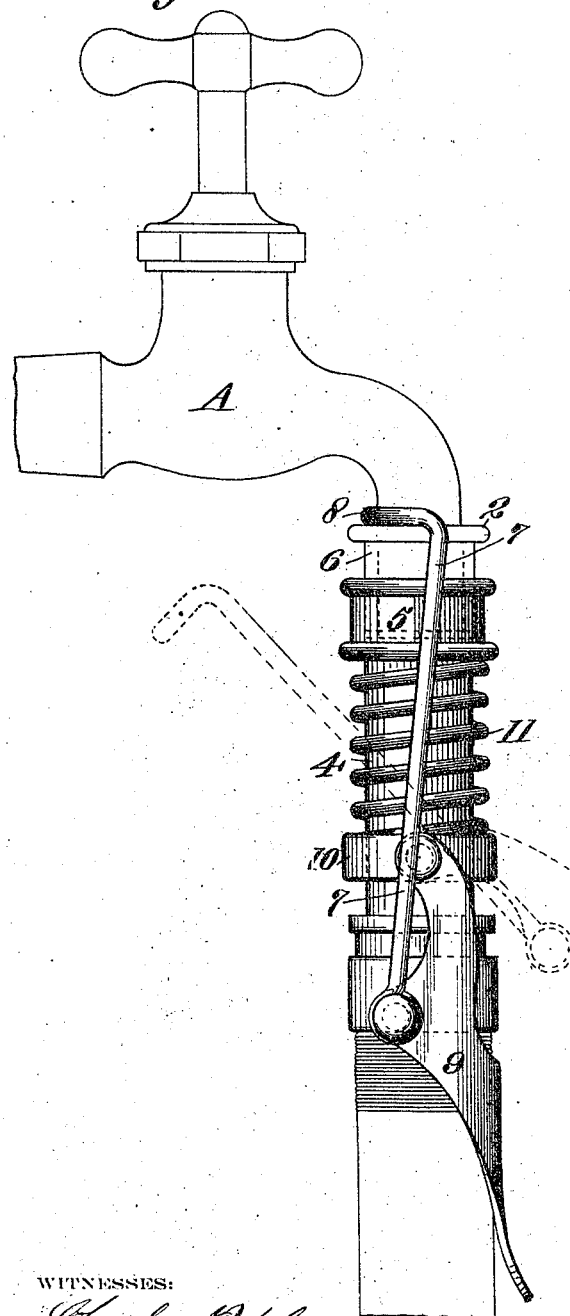
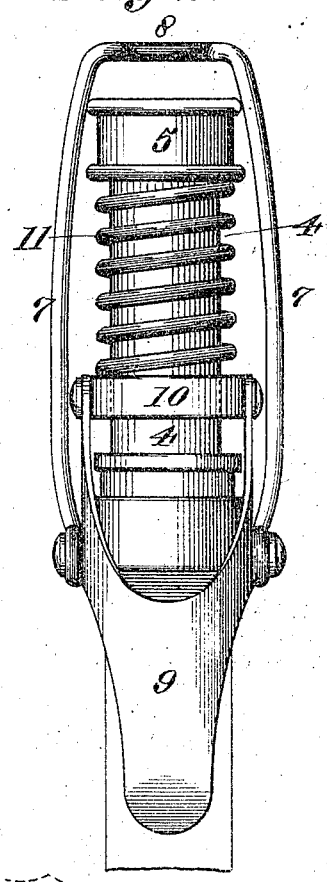
WITNESSES:
Charles Rickles
Thos Leather
INVENTOR
Frank H. Andrews
BY G. H. Strong
ATTORNEY

UNITED STATES PATENT OFFICE.

FRANK H. ANDREWS, OF OAKLAND, CALIFORNIA.

FAUCET-COUPLING ATTACHMENT.

1,122,844.  Specification of Letters Patent.  Patented Dec. 29, 1914.

Application filed June 3, 1914. Serial No. 842,647.

*To all whom it may concern:*

Be it known that I, FRANK H. ANDREWS, a citizen of the United States, residing at Oakland, in the county of Alameda and State of California, have invented new and useful Improvements in Faucet-Coupling Attachments, of which the following is a specification.

My invention relates to a device, which is especially designed for coupling faucets to hose or like conducting attachments, whereby a tight and elastic joint may be formed at the coupling point.

It consists of a coupling link, a lever attachment therefor, and an interposed elastic pressure spring and ring upon which the lever is mounted.

It also comprises details of construction which will be more fully explained by reference to the accompanying drawings, in which —

Figure 1 shows the parts connected. Fig. 2 shows the parts disconnected.

As shown in the drawings, A is a faucet of any usual construction, the discharge nozzle or end of which has a flange or shoulder 2 formed upon it. 3 represents the conductor part to be connected with the faucet, and 4 is a tubular portion extending beyond the main conductor and having a cup-shaped end or enlargement 5 which is adapted to receive the end 6 of the faucet and a suitable washer for forming a tight joint. In order to hold these parts together, I have shown a link 7, bent so that the bight forms a loop 8 extending partially around the discharge end of the faucet and rests upon the flange or shoulder 2; thence extending downwardly upon each side of the tubular portion 4. The ends are inturned so as to engage with a lever 9. This lever has an operative portion projecting along the connecting conductor 3 and the sides are bent in a semicircular form to inclose the conductor and for the purpose of connecting the ends of the link, as above described. At the point where the link is connected the lever extends upwardly upon each side of the tubular portion 4 and has holes which serve to connect it with a ring 10 which fits and is loosely slidable upon the tube 4. The connection may be made by means of studs or lugs upon each side of the ring.

11 is a spiral spring surrounding the tube 4. One end of this spring abuts against the enlarged head 5 and the other against the slidable ring 10. When the parts are disconnected, the spring will be allowed to expand and the lever will assume a position substantially at right angles with the conductor. When the parts are to be coupled, the bent bight of the link is passed over the shoulder of the faucet, and the lever is then pulled downwardly until it lies against the side of the pipe to which the coupling is to be made. This action causes the ring 10 to be forced along the tube 4 and thus compress the spring so as to draw the discharge end of the faucet firmly into the socket and retain it there.

The curvature of the lever is such that, when it is drawn down to couple the parts together, the connection of the link ends will be slightly out of line with the fulcrum point of the lever upon the ring so as to insure the parts remaining in engagement. The coupling is thus made rapidly and securely and may be readily engaged or disengaged upon occasion.

Having thus described my invention, what I claim and desire to secure by Letters Patent is—

In combination with a faucet having an annular shoulder formed on its discharge end, a coupling comprising a tubular portion having a cup-shaped enlargement upon its upper end, a ring slidably mounted on the tubular portion, a coil spring encircling the tubular portion and having its upper end engaged with said enlargement and its lower end resting upon the ring, a lever having arms, said arms being pivotally connected to the ring, a link having a bight portion bent at right angles and adapted to engage over said shoulder, the ends of said link being pivotally connected to the lever at points out of alinement with the pivotal connections of the arms and ring, said lever when swung to its operative position serving to slide said ring upwardly thereby compressing the spring, the compression of said spring tending to hold the bight portion in yielding engagement with said shoulder and said enlargement in engagement with the discharge end of the faucet.

In testimony whereof I have hereunto set my hand in the presence of two subscribing witnesses.

FRANK H. ANDREWS.

Witnesses:
L. D. STOCKTON,
M. W. QUICK.